US009317498B2

(12) United States Patent
Baker et al.

(10) Patent No.: US 9,317,498 B2
(45) Date of Patent: Apr. 19, 2016

(54) SYSTEMS AND METHODS FOR GENERATING SUMMARIES OF DOCUMENTS

(71) Applicant: Codeq LLC, Apex, NC (US)

(72) Inventors: Douglas Dane Baker, Apex, NC (US); Paulo Malvar Fernández, La Mesa, CA (US); Brian Fernandes, San Diego, CA (US); Rodrigo Alarcón Martinez, Leipzig (DE)

(73) Assignee: CODEQ LLC, Apex, NC (US)

( * ) Notice: Subject to any disclaimer, the term of this patent is extended or adjusted under 35 U.S.C. 154(b) by 0 days.

(21) Appl. No.: 14/681,612

(22) Filed: Apr. 8, 2015

(65) Prior Publication Data
US 2015/0339288 A1 Nov. 26, 2015

Related U.S. Application Data

(60) Provisional application No. 62/002,350, filed on May 23, 2014.

(51) Int. Cl.
*G06F 17/27* (2006.01)
*G06F 17/20* (2006.01)
*G06F 17/21* (2006.01)

(52) U.S. Cl.
CPC .................................. *G06F 17/2705* (2013.01)

(58) Field of Classification Search
CPC ..................................................... G06F 17/02
USPC ............................ 704/1, 9, 10, 257, 270–275
See application file for complete search history.

(56) References Cited

U.S. PATENT DOCUMENTS 7,496,567 B1 * 2/2009 Steichen
8,423,587 B2 * 4/2013 Timmons ...................... 707/803

(Continued)

FOREIGN PATENT DOCUMENTS

WO WO 2013066497 5/2013
WO WO 2014042612 3/2014

OTHER PUBLICATIONS

Masum et al. "Emotion Sensitive News Agent: An Approach Towards User Centric Emotion Sensing from the News". 2007 IEEE/WIC/ACM International Conference in Web Intelligence. pp. 614-620.*

(Continued)

*Primary Examiner* — Jesse Pullias
(74) *Attorney, Agent, or Firm* — Hunton & Williams LLP

(57) ABSTRACT

Systems and methods for summarizing online articles for consumption on a user device are disclosed herein. The system extracts the main body of an article's text from the HTML code of an online article. The system may then classify the extracted article into one of several different categories and removes duplicate articles. The system breaks down the article into its component sentences, and each sentence is classified into one of three categories: (1) potential candidate sentences that may be included in the generated summary; (2) weakly rejected sentences that will not be included in the summary but may be used to generate the summary; and (3) strongly rejected sentences that are not included in the summary. Finally, the system applies a document summarizer to generate quickly readable article summaries, for viewing on the user device, using relevant sentences from the article while maintaining the coherence of the article.

12 Claims, 8 Drawing Sheets

(56) References Cited

U.S. PATENT DOCUMENTS

| | | | |
|---|---|---|---|
| 8,849,809 B1* | 9/2014 | Seshadri | 707/725 |
| 2007/0118518 A1 | 5/2007 | Wu | |
| 2007/0260586 A1* | 11/2007 | Savona et al. | 707/3 |
| 2011/0055209 A1* | 3/2011 | Novac et al. | 707/737 |
| 2011/0107197 A1* | 5/2011 | DeLuca et al. | 715/234 |
| 2011/0320543 A1* | 12/2011 | Bendel et al. | 709/206 |
| 2013/0346349 A1 | 12/2013 | Gross et al. | |

OTHER PUBLICATIONS

Gerard Salton, "Dynamic Document Processing"; Communications of the ACM, Jul. 1972, vol. 15, No. 7; pp. 658.

Abdur Chowdhury, Ophir Frieder, David Grossman, and Mary Catherine McCabe, 'Collection Statistics for Fast Duplicate Document Detection', Illinois Institute of Technology, AMC Transactions on Information Systems, vol. 20, No. 2, Apr. 2002, pp. 171-191.

Giridhar Kumaran, James Allan, 'Using Names and Topics for New Event Detection', Proceedings of Human Language Technology Conference and Conference on Empirical Methods in Natural Language Processing (HLT/EMNLP), pp. 121-128, Vancouver, Oct. 2005. c 2005 Association for Computational Linguistics.

Max Louwerse, Art Graesser, A.C. (2005), 'Coherence in discourse', In Strazny, P. (ed.), Encyclopedia of linguistics, Chicago, Fitzroy Dearborn, pp. 1-7.

Gang Luo, Chunqiang Tang, Philip S. Yu, 'Resource-Adaptive Real-Time New Event Detection', IBM T.J. Watson Research Center, SIGMOD'07, Jun. 11-14, 2007, Beijing, China, 2007 ACM 978-1-59593-686-8/07/0006, {luog, ctang, psyu}@us.ibm.com.

Martin Potthast, Benno Stein, 'New Issues in Near-duplicate Detection', Preisach, Burkhardt, Schmidt-Thieme, Decker (Eds.): Data Analysis, Machine Learning and Applications, Selected Papers from the 31th Conf. of the German Classification Society, Berlin, ISBN 978-3-540-78239-1, pp. 601-609, c Springer 2008.

Martin Theobald, Jonathan Siddharth, Andreas Paepcke, 'SpotSigs: Robust and Efficient Near Duplicate Detection in Large Web Collections', Stanford University, Department of Computer Science, SIGIR'08, Jul. 20-24, 2008, Singapore., Copyright 2008 ACM 978-1-60558-164-4/08/07, {theobald,siddharth.jonathan,paepcke}@cs.stanford.edu.

Hila Becker, Mor Naaman, Luis Gravano, 'Learning Similarity Metrics for Event Identification in Social Media', WSDM'10, Feb. 4-6, 2010, New York City, New York, USA., ©2010 ACM 978-1-60558-889-6/10/02, hila@cs.columbia.edu, mor@rutgers.edu, gravano@cs.columbia.edu.

Felix Naumann, Melanie Herschel, 'Synthesis Lectures on Data Management #3 —An Introduction to Duplicate Detection', © 2010 by Morgan & Claypool Publishers.

Navneet Goyal, Poonam Goyal, K Venkatramaiah, Deepak P C, and Sanoop P S, 'An Efficient Density Based Incremental Clustering Algorithm in Data Warehousing Environment', 2009 International Conference on Computer Engineering and Applications, IPCSIT vol. 2 (2011) © (2011) IACSIT Press, Singapore, E-mail address: nt_goyal@yahoo.com.

Hui Song,Lifeng Wang, Baiyan Li and Xiaoqiang Liu, 'New Trending Events Detection based on the Multi-Representation Index Tree Clustering', I.J. Intelligent Systems and Applications, © 2011, 3, 26-32 Published Online May 2011 in MECS (http://www.mecs-press.org/).

Cheng-Fa Tsai, Tang-Wei Huang, 'QIDBSCAN: A Quick Density-Based Clustering Technique', 2012 International Symposium on Computer, Consumer and Control, pp. 638-641.

Jon Borglund, 'Event-Centric Clustering of News Articles', Uppsala Universitet, Oct. 2013, pp. 1-33.

Michael Gamon, Tae Yano, Xinying Song, Johnson Apacible, Patrick Pantel, 'Understanding Document Aboutness Step One: Identifying Salient Entities', Microsoft Research Technical Report MSR-TR-2013-73, Published Nov. 2013, pp. 1-21.

Margarita Karkali, Francois Rousseau, Alexandros Ntoulas, Michael Vazirgiannis, 'Efficient Online Novelty Detection in News Streams', X. Lin et al. (Eds.):WISE 2013, Part I, LNCS 8180, pp. 57-71, 2103.c• Springer-Verlag Berling Heidelberg.

Benjamin E. Teitler, Jagan Sankaranarayanan, Henan Samet, and Marco D. Adel, 'Online Document Clustering Using GPUs', Department of Computer Science, University of Maryland, to appear in the ADBIS workshop on GPUs in Databases, Sep. 2013, Genoa, Italy, pp. 1-10.

Xie Ping, Zhang Lin, Wang Ying, Li Qinqian, 'Application of an Improved DBSCAN Algorithm in Web Text Mining', International Workshop on Cloud Computing and Information Security (CCIS 2013) , © 2013. The authors—Published by Atlantis Press, pp. 400-403.

Joel Azzopardi, Christopher Staff, 'Incremental Clustering of News Reports', Algorithms, Aug. 24, 2012, 5, 364-378.

Michael Gamon, Tae Yano, Xinying Song, Johnson APACIBLEe, Patrick Pantel, 'Identifying Salient Entities in Web Pages', Copyright 2013 ACM 978-1-4503-2263.

Sanjay Chakraborty, Prof. N.K.Nagwani, International Journal of Enterprise Computing and Business Systems, ISSN (Online) : 2230-8849, http://www.ijecbs.com, vol. 1 Issue 2 Jul. 2011.

Nidhi Suthar, Prof. Indr jeet Rajput , Prof. Vinit kumar Gupta, 'A Technical Survey on DBSCAN Clustering Algorithm', International Journal of Scientific & Engineering Research, vol. 4, Issue 5, May 2013, pp. 1775-1781.

Ayman Alhelbawy, Robert Gaizauskas, 'Graph Ranking for Collective Named Entity Disambiguation', Proceedings of the 52nd Annual Meeting of the Association for Computational Linguistics (Short Papers), pp. 75-80, Baltimore, Maryland, USA, Jun. 23-25 2014. c 2014 Association for Computational Linguistics.

Yiming Yang, Tom Pierce, Jaime Carbonell, 'A Study on Retrospective and On-Line Event Detection', Carnegie Mellon University, SIGIR'98, Melbourne, Australia, ACM 1-58113-015-5 8/98.

Jaime Carbonell, Jade Goldstein, 'The Use of MMR, Diversity-Based Reranking for Recordinger Documents and Producing Summaries', 1998 ACM 1-58113-015-5 8/98, SIGIR'98, Melbourne, Australia.

Ronald K. Braun and Ryan Kaneshiro, 'Exploiting Topic Pragmatics for New Event Detection in TDT-2004', 2004, Stottler Henke Associates, Inc., San Mateo, CA.

Michael Wick, Sameer Singh, Harshal Pandya, Andrew McCallum, A Joint Model for Discovering and Linking Entities; {mwick, sameer, harshal, mccallum}@cs.umass.edu; paper presented at FLAIRS Conference—May 12, 2004, pp. 695-699.

Douglass R. Cutting; David R. Karger, Jan O. Pedersen, John W. Tukey, 'Scatter/Gather: A Cluster-based Approach to Browsing Large Document Collections', pp. 318-329, Jun. 1, 1992—pp. 318-329—paper presented at SIGIR '92 Proceedings of the 15th Annual International ACM SIGIR Conference on Research and Development in Information Retrieval.

Martin Ester, Hans-Peter Kriegel, Jörg Sander, Xiaowei Xu, A Density-Based Algorithm for Discovering Clusters in Large Spatial Databases with Noise, Institute for Computer Science, University of Munich; Oettingenstr.6 7, D-80538M tinchen, Germany {ester I kriegel I sander I xwxu} @informatik.uni-muenchen.de; pp. 226-231, 1996, Conference paper presented at Proceedings of 2nd International Conference on Knowledge Discovery.

James Allan, Ron Papka, Victor Lavrenko; 'On-line New Event Detection and Tracking', Center for Intelligent Information Retrieval, Computer Science Department, University of Massachusetts, Amherst, MA 01003; pp. 1-9, Aug. 1, 1998—paper published in SIGIR '98 Proceedings of the 21st Annual International ACM SIGIR Conference on Research and Development in Information Retrieval.

Martin Ester, Hans-Peter Kriegel, Jörg Sander, Michael Wimmer, Xiaowei Xu, 'Incremental Clustering for Mining in a Data Warehousing Environment', Institute for Computer Science, University of Munich; email: {ester 1 kriegel I sander I wimmerm I xwxu}@informatik.uni-muenchen.de, Aug. 24, 1998—VLDB '98 Proceedings of the 24th International Conference on Very Large Data Bases—pp. 323-333.

Bjornar Larsen, Chinatsu Aone, 'Fast and Effective Text Mining Using Linear-time Document Clustering', SRA International, Inc. {bjornar_larsen, aonec}@sra.com, pp. 16-22, Aug. 1, 1999—KDD '99 Proceedings of the fifth ACM SIGKDD International Conference on Knowledge Discovery and Data Mining, pp. 16-22.

(56) References Cited

OTHER PUBLICATIONS

Andrei Z. Broder, 'Identifying and Filtering Near-Duplicate Documents', AltaVista Company, San Mateo, CA, andrei.broder@ay.com, Jun. 21, 2000—paper published in Proceeding COM '00 of the 11th Annual Symposium on Combinatorial Pattern Matching—pp. 1-10.
Vasileios Hatzivassiloglou, Luis Gravano, Ankineedu Maganti, 'An Investigation of Linguistic Features and Clustering Algorithms for Topical Document Clustering', Department of Computer Science, Columbia University, New York, NY, {vh, gravano, amaganti}@cs.columbia.edu, Jul. 1, 2000—paper published in SIGIR '00 Proceedings of the 23rd Annual International ACM SIGIR Conference on Research and Development in Information Retrieval.
Sanjiv K. Bhatia, 'Adaptive K-Means Clustering', Department of Mathematics & Computer Science, University of Missouri—St. Louis, St. Louis, MO 63121, sanjiv@acm.org, May 12, 2004—paper presented at Flairs Conference, pp. 695-699.
Giridhar Kumaran and James Allan, 'Text Classification and Named Entities for New Event Detection', Center for Intelligent Information Retrieval, Department of Computer Science, University of Massachusetts Amherst, Amherst, MA, {allan,giridhar}@cs.umass.edu,—Jul. 25, 2004—paper published in SIGIR '04 Proceedings of the 27th Annual International ACM SIGIR Conference on Research and Development in Information Retrieval—pp. 297-304.
Regina Barzilay, Mirella Lapata, 'Modeling Local Coherence: An Entity-Based Approach', Massachusetts Institute of Technology, University of Edinburg, Computational Linguistics, vol. 34, No. 1, pp. 1-34,—Mar. 1, 2008 (also published Jun. 25, 2005—paper presented at ACL '05 Proceedings of the 43rd Annual Meeting on Association for Computational Linguistics—pp. 141-148).
Shi Zhong, 'Efficient Online Spherical K-means Clustering', Department of Computer Science and Engineering, Florida Atlantic University, Boca Raton, FL, Email: zhong@cse.fau.edu,—Jul. 31-Aug. 4, 2005—published in Neural Networks. 2005, IJCNN '05 Proceedings, 2005 IEEE International Joint Conference—vol. 5, pp. 3180-3185
Yaniv Bernstein, Milad Shokouhi, Justin Zobel, 'Compact Features for Detection of Near-Duplicates in Distributed Retrieval', School of Computer Science and Information Technology, RMIT University, Melbourne, Australia,—Oct. 11, 2006—Lecture Notes in Computer Science, vol. 4209, p. 110-121.
Monika Henzinger, 'Finding NearDuplicate Web Pages: A Large Scale Evaluation of Algorithms', Google Inc. & Ecole F'ed'erale de Lausanne (EPFL), monika@google.com,—Aug. 6, 2006—ISIGIR '06 Proceedings of the 29th Annual International ACM SIGIR Conference on Research and Development in Information Retrieval—pp. 284-291.
Joel W. Reed, Yu Jiao, Thomas E. Potok, Brian A. Klump, Mark T. Elmore, and Ali R. Hurson, 'TF-ICF: A New Term Weighting Scheme for Clustering Dynamic Data Streams', Applied Software Engineering Research Group, Oak Ridge, TN; Computer Science and Engineering Department, University Park, PA, Dec. 2006—paper published in 5th International Conference on Machine Learning and Applications, 2006, ICMLA '06—pp. 258-263.
Chuan Xiao, Wei Wang, Xuemin Lin, Jeffrey Xu Yu, Guoren Wang, 'Efficient Similarity Joins for Near Duplicate Detection', ACM Transactions on Database Systems, vol. V, No. N, Article A, Publication date: Jan. YYYY, pp. A-A40—ACM Transactions on Database Systems (TODS), vol. 36, issue 3, Aug. 2011, article No. 15; also published earlier Apr. 21, 2008—paper published in WWW '08 Proceedings of the 17th International Conference on World Wide Web—pp. 131-140.
Ni Lao, Amarnag Subramanya, Fernando Pereira, William W. Cohen, 'Reading the Web with Learned Syntactic-Semantic Inference Rules', Carnegie Mellon University, Google Research, nlao@cs.cmu.edu (asubram,pereira}@google.com, wcohen@cs.cmu.edu—Jul. 12, 2012—paper published in EMNLP-CoNLL '12 Proceedings of the 2012 Joint Conference on Empirical Methods in Natural Language Processing and Computational Natural Language Learning, pp. 1017-1026.
Jesse Dunietz, Dan Gillick, 'A New Entity Salience Task with Millions of Training Examples', Carnegie Mellon University, Google Research, https://code.google.com/p/nyt-salience—2014—paper presented at Proceeding of the European Association for Computational Linguistics, Association for Computational Linguistics.
Wei Shen, Jianyong Wang, Jiawei Han, 'Entity Linking with a Knowledge Base: Issues, Techniques, and Solutions', DOI 10.1109/TKDE.2014.2327028, IEEE Transactions on Knowledge and Data Engineering, pp. 1-20—Feb. 1, 2015—published in IEEE Transactions on Knowledge and Data Engineering, vol. 27, issue 2, pp. 443-460.
Thomas Lin, Mausam, Oren Etzioni, Entity Linking at Web Scale, University of Washington's Turing Center, Seattle, WA, {tlin, mausam, etzioni}@cs.washington.edu—Jun. 7, 2012—paper presented at AKBC-WEKEX '12 Proceedings of the Joint Workshop on Automatic Knowledge Base Construction and Web-scale Knowledge Extraction, pp. 84-88.
Andrei Z. Broder, 'On the resemblance and containment of documents', Digital Systems Research Center, Palo Alto, CA, broder@pa.dec.com, pp. 1-9—Jun. 11, 1997—paper presented at Sequences '97—Proceedings of the Compression and Complexity of Sequences—p. 21.
Branimir Boguraev (Apple Research Laboratories), Christopher Kennedy (University of California, Santa Cruz), 'Salience-based Content Characterisation of Text Documents', www.nytimes.com/library/cyber/digicom/012797digicom.html—Jul. 23, 1997—paper published in Proceedings of ACL '97 Workshop on Intelligent, Scalable Text Summarization, pp. 1-29; also published as chapter in Advances in Automatic Tect Summarization, 1999 (MIT Press), pp. 2-9.
Michael Steinbach, George Karypis, Vipin Kumar, 'A Comparison of Document Clustering Techniques', Department of Computer Science I Army HPC Research Center, University of Minnesota, pp. 1-2, paper presented at the KDD Workshop on Text Mining—see also http://glaros.dtc.umn.edu/gkhome/node/157, 2000.
International Search Report dated Aug. 20, 2015 for PCT application No. PCT/US2015/031980.
Written Opinion dated Aug. 20, 2015 for PCT application No. PCT/US2015/031980.
International Search report and the Written Opinion of the International Searching Authority dated Aug. 20, 2015 for PCT application No. PCT/US2015/031980.

\* cited by examiner

SYSTEMS AND METHODS FOR GENERATING SUMMARIES OF DOCUMENTS

CROSS-REFERENCE TO RELATED APPLICATIONS

This application contains subject matter related to and claims the benefit of U.S. Provisional Patent Application No. 62/002,350, filed on May 23, 2014, the entire contents of which is incorporated herein by reference.

BACKGROUND INFORMATION

With the growth of online and digital media, today, more and more consumers are accessing media content on mobile platforms. Many consumers receive all of their news-related content on mobile platforms, instead of in print form. Many mobile platforms, such as smartphones, are not ideally suited for presenting long-form news content, due to the limited screen size. These and other drawbacks exist.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

Figure 1:
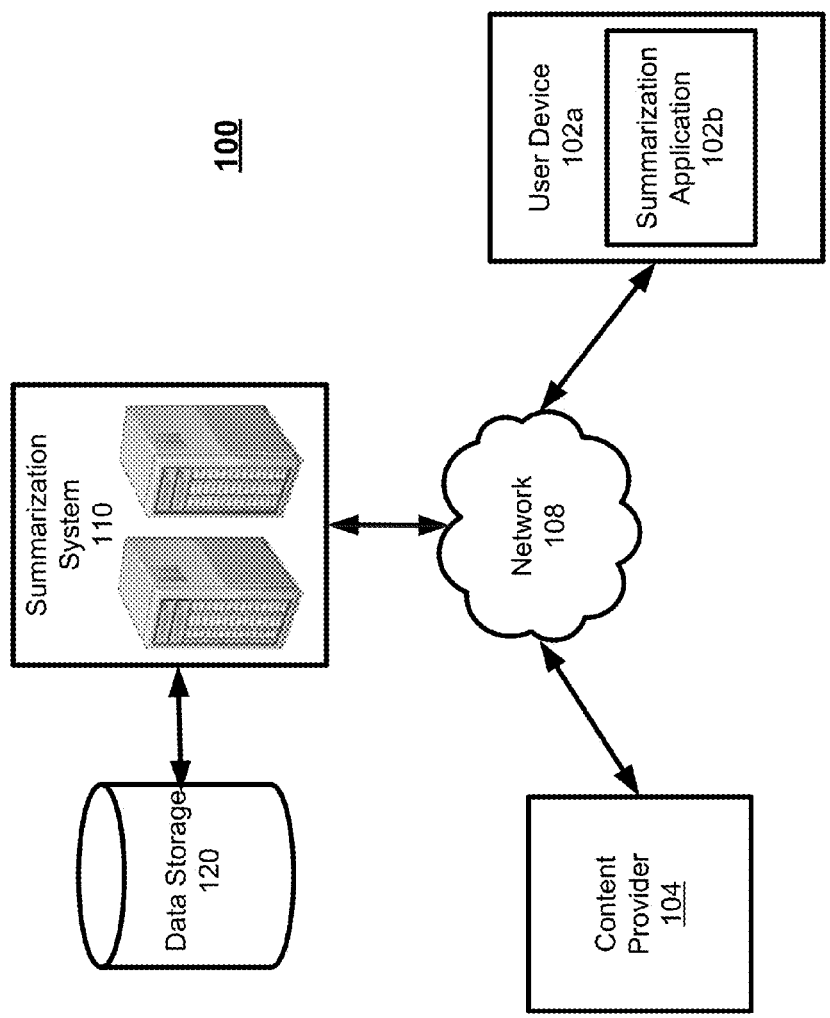
FIG. 1 is a schematic diagram illustrating a system according to a particular embodiment.

The disclosure herein describes systems and methods for summarizing single document articles for consumption on a user device, specifically a mobile device (such as a smartphone or tablet). The systems and methods disclosed herein feature an innovative single document summarization engine that combines both unsupervised Machine Learning techniques and linguistically motivated rules to significantly improve the quality of generated summaries. The systems and methods may improve the quality of the generated summaries by reducing the risk of including sentences that will impact the summary coherence. Coherence is a linguistic concept that can be succinctly defined as the logical connections that humans perceive in a text (written or oral). The systems and methods disclosed herein block sentences that contain linguistic markers that build the internal coherence of articles while at the same time taking advantage of the content of these blocked sentences to select the set sentences of an article (such as a news article) that most relevantly summarize it. For example, an article may include several sentences with discourse markers and/or connectors like "however", "in addition", "meanwhile", etc. Including these sentences in the generated summary could break the flow of ideas of the original article. For instance, a sentence that starts with the adversative "however" is contradicting an idea expressed before this sentence. Including this sentence in the summary without including the sentences that includes the idea that it is contradicting would lead to an incomprehensible summary from the point of view of its internal coherence. The summary is designed to fit on the screen of most tablets and smartphones.

The system may initially extract the main body of text from the HTML code of an article. The system may then classify the extracted article into one of several different categories. The system also identifies duplicate articles and removes them. The system breaks down each article into its component sentences, and each sentence is classified into one of three categories: (1) potential candidate sentences that may be included in the generated summary; (2) weakly rejected sentences that will not be included in the summary, but may be used to help generate the summary; and (3) strongly rejected sentences that are not included in the summary or used to generate the summary. Finally, the system applies a document summarizer, which features an innovative summarization algorithm that leverages linguistic information to reduce the risk of producing incoherent summaries. In this way, the system generates quickly readable article summaries, for viewing on the screen of a smartphone or tablet computer, using relevant sentences from the article that maintain the coherence of the article.

The description below describes user interface modules, parsing modules, extraction modules, classification modules, deduplication modules, preprocessing modules, rules modules, marker modules, summarization modules, user devices, content providers, computer systems, and networks that may include one or more modules, some of which are explicitly shown while others are not. As used herein, the term "module" may be understood to refer to computing software, firmware, hardware, and/or various combinations thereof. It is noted that the modules are examples. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

It is further noted that software described herein may be tangibly embodied in one or more physical media, such as, but not limited to, a compact disc ("CD"), a digital versatile disc ("DVD"), a floppy disk, a hard drive, read only memory ("ROM"), random access memory ("RAM"), as well as other physical media capable of storing software, and/or combinations thereof. The functions described as being performed at various components may be performed at other components, and the various components may be combined and/or separated. Other modifications also may be made FIG. 1 is a schematic diagram illustrating a system according to particular embodiments. As illustrated in FIG. 1, system 100 may include a user device 102a, content provider 104, network 108, and summarization system 110. User device 102a may be, for example, but not limited to, a cellular telephone, Session Initiation Protocol ("SIP") phone, software client/phone, a desktop computer, a laptop/notebook, a server, a module, a satellite phone, a personal digital assistant ("PDA"), a tablet computer, a smartphone, a remote controller, a personal computer ("PC"), a workstation, a handheld PC, a handheld MP3 player, a handheld video player, a personal media player, a gaming device, a thin system, a fat system, a network appliance, and/or other mobile communication device that may be capable of transmitting and/or receiving data. Also, user device 102a may include one or more transmitters, receivers, and/or transceivers to transmit and/or receive one or more signals to and/or from other components depicted in FIG. 1, including, for example, content provider 104, network 108, and/or summarization system 110.

Network 108 may be a wireless network, a wired network, or any combination of wireless network and wired network. For example, network 108 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, Long Term Evolution (LTE) network, LTE Advanced (LTE-A) network, Mobile WiMAX (IEEE 802.16e), Mobile WiMAX Release 2 (IEEE 802.16m) network, IEEE 802.11a, 802.11b, 802.15.1, 802.11n and 802.11g or any other wired or wireless network for transmitting and/or receiving a data signal. In addition, network 108 may include, without limitation, telephone line, fiber optics, IEEE Ethernet 802.3, a wide area network ("WAN"), a local area network ("LAN"), or a global network such as the Internet. Also, network 108 may support, an Internet network, a wireless communication network, a cellular network, or the like, or any combination thereof. Networks 108 may further include one, or any number of the exemplary types of networks mentioned above operating as a stand-alone network or in cooperation with each other. Network 108 may utilize one or more protocols of one or more network elements to which it is communicatively coupled. Network 108 may translate to or from other protocols to one or more protocols of network devices. Although network 108 is depicted as one network, it should be appreciated that according to one or more embodiments, network 108 may comprise a plurality of interconnected networks, such as, for example, a service provider network, the Internet, a broadcaster's network, a cable television network, corporate networks, and home networks.

The components depicted in FIG. 1 may transmit and receive data to and from network 108 representing broadcast content, user request content, parallel search queries, parallel search responses, and other data. The data may be transmitted and received utilizing a standard telecommunications protocol or a standard networking protocol. For example, one embodiment may utilize Session Initiation Protocol ("SIP"). In other embodiments, the data may be transmitted and/or received utilizing other Voice Over IP ("VOIP") or messaging protocols. For example, data may also be transmitted and/or received using Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet ("TCP/IP") Protocols, or other protocols and systems suitable for transmitting and receiving broadcast or parallel search data. Data may be transmitted and received wirelessly or may utilize cabled network or telecom connections such as an Ethernet RJ45/Category 5 Ethernet connection, a fiber connection, a traditional phone wireline connection, a cable connection or other wired network connection. Network 108 may use standard wireless protocols including IEEE 802.11a, 802.11b and 802.11g. Network 108 may also use protocols for a wired connection, such as an IEEE Ethernet 802.3.

Content provider 104 may be one or more web-based media sources. Content provider 104 may host one or more websites that include news articles, commentary, blogs, videos, graphics, images, and other media content. Content provider 104 may aggregate media content from a plurality of other sources. User device 102a and/or summarization system 110 may access content provider 104 via network 108.

User device 102a may include summarization application 102b. Summarization application 102b may be a combination of software and/or hardware configured to provide one or more GUIs for user device 102a to transmit data to and from summarization system 110. Summarization application 102b may be a local application on user device 102a. Summarization application 102b may be a web-based application hosted by summarization system 110.

Figure 2:
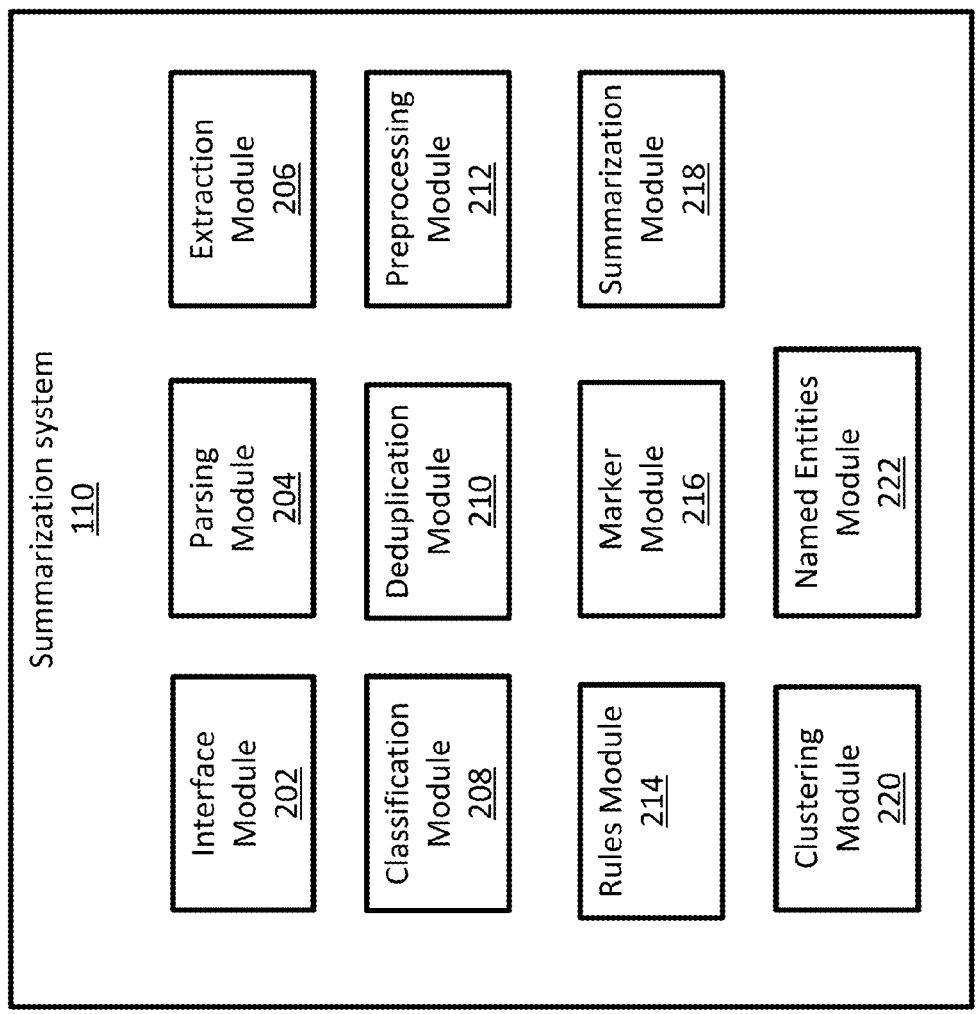
FIG. 2 is a block diagram of a hardware component of the monitoring system according to a particular embodiment.

As shown in FIG. 2, summarization system 110 may include a user interface module 202, a parsing module 204, an extraction module 206, a classification module 208, a deduplication module 210, a preprocessing module 212, a rules module 214, a marker module 216, and a summarization module 218. It is noted that the modules 202, 204, 206, 208, 210, 212, 214, 216, and 218 are exemplary and the functions performed by one or more of the modules may be combined with that performed by other modules. The functions described herein as being performed by the modules 202, 204, 206, 208, 210, 212, 214, 216, and 218 also may be separated and may be located or performed by other modules. Moreover, the modules 202, 204, 206, 208, 210, 212, 214, 216, and 218 may be implemented at other devices of the system 100 (e.g., content provider 104). Also, in various embodiments, summarization system 110 may be a resolution server or may be a module of, or communicatively coupled to, a Domain Name System ("DNS") server, such as a BIND server, for converting host names and domain names into IP addresses over the Internet. Summarization system 110 may comprise one or more network enabled computers. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device.

Interface module 202 may be configured to interface with user device 102a and/or content provider 104. Interface module 202 may receive data from user device 102a and/or content provider 104 and provide data to user device 102a and/or content provider 104. The user of user device 102a may interact with interface module 202 using manual input (e.g., typing into a keyboard or keypad, etc.), voice input, touch screen input, graphical input (e.g., camera or camcorder) and/or any other method for inputting information or data to user device 102a.

Parsing module 204 is configured to parse one or more Rich Site Summary (RSS) feeds. The RSS feeds may be provided by content provider 104. The RSS feed may include one or more entries identifying an article published by content provider 104. The RSS feeds may be monitored by interface module 202 and/or parsing module 204. The RSS feeds may be a precompiled list of RSS feeds that are published and constantly updated by content provider 104. Parser module 204 stores a precompiled list of RSS feeds in data storage 120 and retrieves them at regular intervals. Parser module 204 may parse the RSS feeds using a third-party open source Python module called Feedparser, for example.

Parser module 204 is configured to parse the RSS feeds to retrieve one or more URLs. Each URL corresponds to a specific article. For each URL retrieved, Parser module 204 also extracts a title and a publication date for that article.

Parser module 204 may maintain a list of previously-retrieved URLs in data storage 120 and compare the latest URL with the URLs in the list to ensure that the URL has not already been retrieved. Parser module 204 may delete URLs from the list of previously-retrieved URLs that were created before a certain date. For example, parser module 204 may delete URL entries whose creation date is older than one month.

Parser module 204 may prepare a set of articles based on the information extracted from the RSS feeds. Each article in the set of articles is associated with a title, a URL, and a publication date. Once parser module 204 has parsed a group of RSS feeds and extracted the URL, title, and publication date for each article, for each article in the set of articles, extraction module 206 may retrieve the textual content embedded in the HTML code of the article, by, for example, scraping the textual content embedded in the article's HTML code. Extraction module 206 may use one or more third-party open source scraping programs, such as, for example, Goose Extractor, Justtext, or some combination of the two.

Once extraction module 206 has extracted the body of text from the HTML code for each article, extraction module 206 then removes boilerplate text snippets that do not belong to the body of text of the reported story. Examples of boilerplate text may include copyright notices, and error messages generated during the scraping and image captioning text. Extraction module 206 may also extract the author of the article, which is used as an anchor to remove automatically generated paragraphs that describe the background and experience of the author reporting the story.

Extraction module 206 then analyzes the base URL of the article to reduce it to its fully qualified domain name (FQDN). The FQDN is the domain name that specifies its exact location in the tree hierarchy of the Domain Name System (DNS). Extraction module 206 may store the FQDN of the news articles' URLs in order to keep track of news stories published by the same news outlet.

For a set of articles, classification module 208 receives the body of text for each article from extraction module 206 and classifies the article into one or more categories. Categories may include for example, and without limitation, U.S. News, World News, Business, Technology, Politics, Sports, Entertainment, Science, and Health.

Preprocessing module 212 is configured to implement one or more preprocessing methods to the body of text and/or the title of each article in the set of articles. Preprocessing module 212 may first implement a tokenization step. During tokenization, the body of text for an article is broken up into words, phrases, symbols and other elements known as tokens. Next, preprocessing module 212 may implement a lowercasing step. During lowercasing, the body of text tokens are normalized by lowercasing them. Next, preprocessing module 212 may implement a stopwords removal step. During stopwords removal, grammatical words, known as stopwords, are removed from the tokenized and lowercased bodies of text. Stopwords include, without limitation, "a", "about", "after", "because", "between", "the", "for", "or", etc. Next, preprocessing module 212 may implement a stemming step. During stemming, remaining body of text tokens are stemmed, that is, reduced to their root form by removing inflectional word endings.

Once the all the previous preprocessing steps are applied, classification module 208 may vectorize the body of text by using a bag-of-words representation using a mixture of unigrams and bigrams. Classification module vectorizes the text by converting the text from words into a sequence of numbers in the form of a one dimensional array. A vector encodes the textual information in the form of numbers that encapsulate information about the text. For example, the sentence "The dog chased the cat", has 4 word types (the, dog, chased, cat). A vector of this sentence this sentence may represent the number of times each word type appears in the sentence: [2, 1, 1, 1], where dimension 1 means the number of times "the" appears, dimension 2 means the number of times dog appears, and so on. The bag-of-words representation is a form of textual vectorization that does not take into account the position in which word types appear in texts. This means that a sentence like "The dog chased the cat" has the same bag-of-words representation as the sentence "The cat chased the dog". Both sentences have the very same 4 word types (the, dog, chased, cat). The sentence "The dog chased the cat" has 5 unigrams: "the", "dog", "chased", "the", "cat", that is each individual word token. The same sentence has 3 bigrams: "the dog", "dog chased", "chased cat", that is sequences of immediately adjacent words.

The generated vector space is first transformed by using the TF-IDF algorithm and, second, its dimensionality is reduced using the Truncated SVD algorithm. TF-IDF (term frequency-inverse document frequency) is a numerical statistic that is intended to reflect how important a word is to a document in a collection or corpus. It is often used as a weighting factor in information retrieval and text mining. The tf-idf value increases proportionally to the number of times a word appears in the document, but is offset by the frequency of the word in the corpus, which helps to control for the fact that some words are generally more common than others. The Truncated SVD algorithm is an algorithm specialized in reducing the dimensionality of vector representations. From the previous example, the sentence "The dog chased the cat" may be represented as a vector of the following form: [2, 1, 1, 1]. This vector has 4 dimensions. The Truncated SVD algorithm applies a set of mathematical functions that analyze each of the dimensions and convert a vector to another vector with a lower dimensionality that encodes the same information in a compacted/condensed manner.

Finally, the individual vectorized document is classified into one of the above-mentioned categories by applying a cascade of One vs One pre-trained Support Vector Machine models. The One vs One classification strategy is applied to classification problems where items need to be classified into more than two categories. This algorithm converts a multi-category problem into a series of simpler binary classification problems by creating pairs of binary categories and training a single classifier for each pair. As previously noted, in this step classification module 208 is classifying each article into one of a plurality of news categories. For example, categorization module 208 may use the following 9 categories: U.S. News, World News, Business, Technology, Politics, Sports, Entertainment, Science, and Health. In some instances, a single article may be assignable to more than one category. The One vs One classification strategy simplifies the multi-category problem by creating pairs of categories and training a single classifier for each pair. Thus, classification module 208 includes a classifier that distinguishes between US News and World News, US News and Business News, US News and Technology News, Technology News and Sports News, Technology News and World News, etc. Each of these is a binary classification where a news item is classified as one category or the other. The category that receives more votes, that is, that is selected more times for a particular article, is the category that it is finally assigned to that article.

Deduplication module 210 is configured to determine whether the body of text for each article in the set of articles represents an article or story that is a duplicate of another article or story that has already been processed and/or summarized. Deduplication module 210 will only compare articles that have been placed in the same category by classification module 208. Deduplication module 210 may use a two stage approach. First, deduplication module 210 may compare new articles within the same category to one another to find duplicate stories. Next, deduplication module may compare the new articles to articles that were published and previously stored in data storage 120 within a certain time period. For example, deduplication module 210 may compare new articles to stored articles form the past 48 hours.

Deduplication module 210 may receive the set of articles that have gone through the previous processing steps described above. Each article may include the body text, title, date, URL, and other information. Deduplication module 210 may first use the titles of each article in the set as a filtering stage to reduce the search space to be explored for article deduplication. Only articles whose titles have a degree similarity higher than a predefined threshold are compared to each other to find duplicates.

Preprocessing module 212 may implement the one or more preprocessing steps on the title of each article using the same steps described previously: (1) tokenization; (2) lowercasing; (3) stopwords removal; and (4) stemming. Once preprocessing module 212 has preprocessed the titles in the set of articles, deduplication module 210 may vectorize the titles using a bag-of-words vectorization approach and the vectors are weighted using the algorithm known as TF-IDF. Finally vectors are reduced in dimensionality using the Latent Semantic Indexing (LSI) algorithm. Latent semantic indexing (LSI) is an indexing and retrieval method that uses a mathematical technique called singular value decomposition (SVD) to identify patterns in the relationships between the terms and concepts contained in an unstructured collection of text. LSI is based on the principle that words that are used in the same contexts tend to have similar meanings A key feature of LSI is its ability to extract the conceptual content of a body of text by establishing associations between those terms that occur in similar contexts.

Deduplication module 210 then compares each title vector to the rest of the title vectors in the set using the cosine similarity algorithm, which outputs a similarity measure for each pair of compared vectors. Cosine similarity is a measure of similarity between two vectors of an inner product space that measures the cosine of the angle between them. The cosine of 0° is 1, and it is less than 1 for any other angle. Cosine similarity is thus a measure of orientation and not magnitude: two vectors with the same orientation have a Cosine similarity of 1, two vectors at 90° have a similarity of 0, and two vectors diametrically opposed have a similarity of −1, independent of their magnitude. Cosine similarity is particularly used in positive space, where the outcome is neatly bounded in [0,1].

Only pairs of articles whose titles have a cosine similarity above a predefined threshold are allow for further comparison. The predefined threshold is a constant that is checked against the cosine similarity value that each pair of articles is assigned. So, in one embodiment, if a pair of article titles have a cosine similarity of 0.5, but the predefined threshold is 0.6, deduplication module 210 deem this pair of article titles as not similar enough. But if a pair of news items have a cosine similarity of 0.7 and the threshold is 0.6 then those two items are deemed as similar enough. The value of this predefined threshold may be empirically set by inspecting the results obtained using different values and choosing the value that renders better results. The set of pairs that do not pass this filtering are removed from search space of potential duplicate pairs of articles.

For the remaining pairs of articles that pass the first title-based filtering step, deduplication module 210 is configured to further analyze each pair of articles based on the notion of "containment" as their similarity comparison measure. Containment is a measure that defines similarity as set a intersection problem as described in the following, labeled Formula 1:

$$c(A,B) = |set(A) \cap set(B)|/set(A) \qquad \text{Formula 1:}$$

In Formula 1, "A" is the first article in a pair of articles that met the title-based filtering step, and "B" is the second article. For a given pair (e.g., articles A and B), preprocessing module 212 may preprocess the body of text of each article in the pair using the following preprocessing steps; (1) tokenization, (2) lowercasing, and (3) stopwords removal. Once this has been done, for each pair of articles, deduplication module 210 may extract the unigrams, bigrams and trigrams from each pair of preprocessed bodies of text and converted into sets of tokens.

Extracted sets of tokens are subsequently intersected as follows:

$$\text{unigrams\_itersec} = set(A\_\text{unigrams}) \cap set(B\_\text{unigrams}),$$

$$\text{bigrams\_itersec} = set(A\_\text{bigrams}) \cap set(B\_\text{bigrams}), \text{ and}$$

$$\text{trigrams\_itersec} = set(A\_\text{trigrams}) \cap set(B\_\text{trigrams})$$

Using these n-gram intersections, deduplication module 210 calculates the following two measures of containment according to Formula 1:

$$\text{Containment of } B \text{ in } A\text{: } c(A,B) = (|\text{unigrams\_itersec}| + |\text{bigrams\_itersec}| + |\text{trigrams\_itersec}|)/set(A); \text{ and} \qquad (1)$$

$$\text{Containment of } A \text{ in } B\text{: } c(B,A) = (|\text{unigrams\_itersec}| + |\text{bigrams\_itersec}| + |\text{trigrams\_itersec}|)/set(B). \qquad (2)$$

In the previous formulas, set(A) equals |A_unigrams|+|A_bigrams|+|A_trigrams|; and set(B) equals |B_unigrams|+|B_bigrams|+|B_trigrams|. Deduplication module 210 then compares c(A,B) with c(B,A) to determine the direction of containment. Thus, if Containment of A in B (c(B,A)) is higher than Containment of B in A (c(A,B)), A is marked as a superset of B, and vice versa.

Furthermore, if the containment measure of the winning superset is higher than a predefined containment threshold, the article that is contained by the superset article is classified as a duplicate and removed. The predefined containment threshold may be empirically set, similar to the threshold used for the cosine similarity algorithm that compared title vectors for two articles. The winning article superset is retained for future comparisons with other articles. The final result of repeating this process for all pairs of articles is a set of unique stories from which duplicate articles have been removed. This set of articles may be referred to as the final set of articles.

Preprocessing module 212 is configured to preprocess the final set of articles prior to summarization. For each article, preprocessing module 212 may first perform tokenization to break up the body of text into words, phrases, symbols and other elements known as "tokens". Preprocessing module 212 may then perform sentence splitting on the tokenized article text by splitting the text into individual sentences by using punctuation as anchors to determine sentence boundaries. Preprocessing module 212 may then perform truecasing on the tokens of each individual sentence to normalize the tokens to their true canonical casing. Preprocessing module 212 may then perform stopwords removal to remove stopwords from individual tokenized and truecased sentences. Finally, preprocessing module 212 may perform stemming by reducing each remaining token to its root form by removing inflexional word endings.

Once individual sentences within each article (from the final set of articles) have been identified and pre-processed, rules module 214 applies a series of rules to each article to accomplish the following steps: 1) extract a series of preliminary numeric measures to be reused by summarization module 218 to score and rank potential candidate sentences; and 2) to identify linguistic markers that can potentially impact the coherence of the generated summary. Potential candidate sentences are sentences within an article that may be used as part of the generated summary.

For each individual sentence of an article, rules module 214 is configured to extract a number of preliminary statistics in order to provide a first process for sentence scoring and ranking within each article. There are two types of statistics that contribute to this score. The first type are positive scoring factors, which contribute to positively score sentences higher in the ranking. The second type are negative scoring factors, which diminish a sentence score, thus, lowering its ranking.

Rules module 214 is configured to scale all negative and positive scoring factors are using the following formula, labeled as Formula 2:

$$\text{score} = \text{factor\_score}/\text{sqrt}(\text{factor\_score} + \text{alpha}) \qquad \text{Formula 2:}$$

In Formula 2, alpha is constant that smooths the scale into which factor is converted. Alpha is an empirically set constant that affects the effect that a smoothing function will have on a particular data series. In this equation higher values of alpha may intensify the effect of the smoothing function, whereas lower values of alpha may reduce the effect of the smoothing function. The factor_score may the score of the scoring factor being considered.

Rules module 214 is configured to collect positive scoring factors for each individual sentence in an article. The first positive scoring factor is the sentence position in the article. This factor is used to favor sentences that are closer to the beginning of the article as these sentences tend to include the most relevant pieces of information for each particular article. For this factor, rules module 214 may use a scaling formula, Formula 3, which is slightly different than Formula 2:

$$\text{position\_factor} = (\text{last\_doc\_position}/(\text{sentence\_position}+1))/\text{sqrt}((\text{last\_doc\_position}/(\text{sentence\_position}+1))+\text{alpha}) \qquad \text{Formula 3:}$$

In Formula 3, last_doc_position is the position of the last sentence in the news item. So, for example, if a article has 20 sentences, the last_doc_position for that article would be 20.

The next positive scoring factor is the number of frequent words present in the sentence. For a given article, rules module 214 may define a "frequent word" as a word that appears a minimum number of times in an article. For example, rules module 214 may define a frequent word as a word that appears at least 3 times in an article. This factor (document frequent words) is used to favor sentences that contain instances of the most frequently used words in the document.

Another positive scoring factor may be the number of document Named Entities present in the sentence. This factor is used to favor sentences that contain instances of the Named Entities (e.g., a proper noun) present in the document. Another positive scoring factor may be the number of sentiment words, that is, words with either positive or negative polarity, present in the sentence. Rules module 214 may maintain a lexicon of sentiment terms that are used to favor sentences that are positively or negatively subjective. For each sentence in the article, rules module 214 may compare the words in the sentence with the lexicon of sentiment terms to determine how many sentiment words are present in that sentence. Another positive scoring factor may be the number of money expressions present in the sentence (e.g., "$20", "$2", "$1,000"). A simple regular expression is used to identify and favor sentences that contain money-related expressions. The regular expression may be: \$\d+,?\d*\.?\d*. This regular expression accepts strings that start with a dollar sign, followed by one of more digits, followed by an optional comma, followed by 0 or more digits, followed by an optional decimal point, followed by 0 or more digits.

Rules module 214 is configured to collect negative scoring factors for each individual sentence in the article. One negative scoring factor may be the length of the sentence. This factor is used to favor sentences that are not too long nor too short. For this factor, Formula 4, a slightly modified version of Formula 2 is used:

$$\text{length\_factor} = \text{abs}(\text{sent\_length} - \text{doc\_sent\_length\_mean})/\text{sqrt}(\text{abs}(\text{sent\_length} - \text{doc\_sent\_length\_mean}) + \text{alpha}) \qquad \text{Formula 4:}$$

In Formula 4, sent_length represents the length of the sentence being considered. Doc_sent_length_mean represents the mean of the sentence lengths for the entire article.

Another negative scoring factor may be the number of sentence negative features. This factor is used to favor sentences that don't have any of the following features present: (1) last character is not a question mark (?); (2) last character is not a colon (:); (3) a demonstrative (this, that, etc.) is not present in the first positions of the sentence; and (4) opening quotations, parentheses or square brackets are not present in the first positions of the sentence.

Once all the positive and negative scoring factors are determined for each sentence, rules module 214 will combine the positive and negative scoring factors of each sentence using Formula 5, resulting into the final preliminary score that will be assigned to that sentence:

$$\text{rule\_score} = \text{sum}(\text{positive\_scoring\_factors}) - \text{sum}(\text{negative\_scoring\_factors}). \qquad \text{Formula 5:}$$

For each article in the final set of articles (i.e., the set of articles that remains after duplicate articles have been removed), marker module 216 is configured to split each sentence of the article into one of three different groups: Potential candidates, weakly rejected candidates, and strongly rejected candidates. Potential candidates are sentences for which no potentially impact in summary coherence has been detected, therefore, they are signaled as fully-qualified candidates for the summary to be generated by summarization module 218. Weakly rejected candidates are sentences for which linguistic markers that could negatively impact the summary coherence have been identified. These sentences are banned from being included in the generated summary but they're kept for further processing by summarization module 218 as they contain valuable information about the article content that needs to be explored. Strongly rejected candidates are sentences that, because they contain some kind of boilerplate element, completely discarded as they are deemed as not containing valuable content for the article.

Marker module 216 is configured to designate a sentence as a weakly rejected sentence based on one or more linguistic markers found in the sentence. These linguistic markers represent local, sentence-to-sentence transition of ideas and concepts within the article discourse. Weakly rejected sentences break the sentence-to-sentence transition of ideas and concepts that the linguistic markers articulate locally. With their local coherence broken, these sentences negatively impact the global coherence of the summary by introducing non-contextualized idea transitions. Marker module 216 may evaluate each sentence based on a predetermined list of weak linguistic markers that indicate that a sentence should be designated as a weakly rejected sentence. These weak linguistic markers may include personal pronouns, demonstrative pronouns, adversative conjunctions, concessive conjunctions, coordinating conjunctions, adverbial discourse connectors, deictic metadiscourse connectors, and temporal adverbs. Furthermore, marker module 216 may designate a sentence as a weakly rejected sentence that doesn't include a verb, as these sentences are normally section titles that contribute to the visual understanding of the article without contributing to its meaning Marker module 216 may require a predetermined number of these weak linguistic markers to be found in a sentence before marker module 216 will designate that sentence as a weakly rejected sentence. In various embodiments, all weakly linguistic markers are weighted equally.

Marker module 216 is configured to designate a sentence as a strongly rejected sentence based on one or more strong linguistic markers. Strongly rejected sentences are sentences that do not contribute to the concepts and ideas of that the article elaborates. Thus, these sentences could be considered discourse boilerplate. Marker module 216 may evaluate each sentence based on a predetermined list of strong linguistic markers that indicate that a sentence should be designated as a strongly rejected sentence. These strong linguistic markers may include gratitude nouns and verbs, greetings, and/or exclamations. Furthermore, marker module 216 may designate a sentence as a strongly rejected sentence based on the presence of lexical terms that belong to the jargon of hypertext, like the verb 'click' in "Click here to find out more", are also used as clues that signal strongly rejected sentences. If marker module 216 evaluates a sentence and determines that the sentence is neither a weakly rejected sentence nor a strongly rejected sentence, marker module 216 may classify that sentence as a potential candidate sentence. At the end of this process, marker module 216 may have created three sets of sentences for each article—a set of potential candidate sentences, a set of weakly rejected sentences, and a set of strongly rejected sentences.

Summarization module 218 is configured to generate an article summary for each article in the final set of articles. The article summary is comprised of a series of one or more sentences from the set of potential candidate sentences, as designated by marker module 216. Summarization module 218 may generate the article summary by implementing a modified version of the algorithm known as Maximal Marginal Relevance to iteratively and dynamically rank potential candidate sentences. Maximal Marginal Relevance (MMR) is an Information Retrieval (IR) algorithm that measures the relevant novelty of a document. A first approximation to measuring relevant novelty is to measure relevance and novelty independently and provide a linear combination as the metric. This linear combination may be described as "marginal relevance", i.e., a document has high marginal relevance if it is both relevant to the query and contains minimal similarity to previously selected documents. MMR's basic formula can be derived as Formula 6:

$$MMR = \mathrm{argmax}(\mathrm{lambda}*\mathrm{sim}(Di,Q) - (1-\mathrm{lambda})\mathrm{max\_sim}(Di,DP)) \quad \text{Formula 6:}$$

In Formula 6, lambda is a weighting constant, sim is the cosine similarity algorithm, Di is a candidate document, Q is the query and DP is the pool of documents already selected as relevant in the previous iterations of the algorithm.

For a given article from the final set of articles, summarization module 218 applies this IR paradigm to generate the article summary by treating the title of the article as the query and the set of potential candidate sentences as the collection of documents searched by the query. Working within this IR paradigm, summarization module 218 uses the following modified version, Formula 7, of the original MMR algorithm.

$$MMR = \mathrm{argmax}(\mathrm{lambda}*(\mathrm{sim}(Si,T) + \mathrm{sim}(Si,DC) + Se\_score) - (1-\mathrm{lambda})\mathrm{max\_sim}(Si,Su)) \quad \text{Formula 7:}$$

In Formula 7, lambda is a weighting constant, sim is the cosine similarity algorithm, Si is a potential candidate sentence, T is the title of the article, DC is the centroid of the article vector space resulting from the combination of both the potential candidate sentences and the weakly rejected sentences sets, Se_score is the score calculated for the potential candidate sentence by rules module 214, and Su is the dynamically generated summary, that is, the set of sentences picked to be included in the summary in previous iterations of the algorithm. In various embodiments, lambda may be empirically set value of 0.6. Summarization module 218 may select sentences from the potential candidate sentences set to be included in the generated summary, whereas weakly rejected sentences and strongly rejected sentences cannot be used in the generated summary.

For each article, summarization module 218 uses term statistics for sentences from both sets (potential candidate sentences and weakly rejected sentences) to generate a combined vector space, which is first transformed by using the TF-IDF algorithm. The TF-IDF algorithm is a numerical statistic that transforms a vector by measuring the importance that each dimension has across the collection of all vectors. This algorithm intensifies the importance of dimensions that are infrequent across all vectors to boost their discriminative power. Next, summarization module 218 reduces the TF-IDF transformed vectors in dimensionality by applying the Truncated SVD algorithm. The Truncated SVD algorithm performs a factorization of a vector matrix to project it into a lower dimensionality space that encodes the information contained in the higher dimensionality space by combining the value of interdependent dimensions. Summarization module 218 then calculates the centroid of the resulting combined and modified vector space by averaging the values of each feature across the entire vector space. The centroid of a vector space represents the point that lays in the center of that high dimensional space. The centroid is a vector with the same dimensionality as the vectors that compose the vector space.

Summarization module 218 then reduces the vector space by removing the vectors that represent the sentences signaled as weakly rejected sentences, preventing them this way from being processed by Formula 7 and, therefore, from being included in the generated summary.

For a given article, summarization module 218 generates the article summary by iteratively running each of the sentences from the set of potential candidate sentences through Formula 7. In the first iteration, summarization module 218 determines the MMR for each potential candidate sentence in the article, then selects the sentence with the highest MMR and adds it to the article summary. Once a sentence has been added to the article summary, summarization module 218 removes that sentence from the set of potential candidate sentences for that article in order to prevent it from being repeatedly selected. In the next iteration, summarization module 218 performs the same process (only this time the set of potential candidate sentences has been modified to remove the previously selected sentence), and selects the sentence having the highest MMR in that iteration, adds that sentence to the article summary, and removes it from the set of potential candidate sentences.

Summarization module 218 repeats this process until the number of characters in the article summary reaches a maximum threshold. The maximum threshold may have been pre-programmed into summarization module 218. For example, in one embodiment, the maximum threshold may be 325 characters. In another embodiment, a user may be able to provide the maximum threshold via interface module 202.

Once the maximum threshold has been reached, summarization module 218 may reorder the sentences in the article summary so that their position in the summary follows the same occurrence order of the sentences in the source article.

Figure 3:
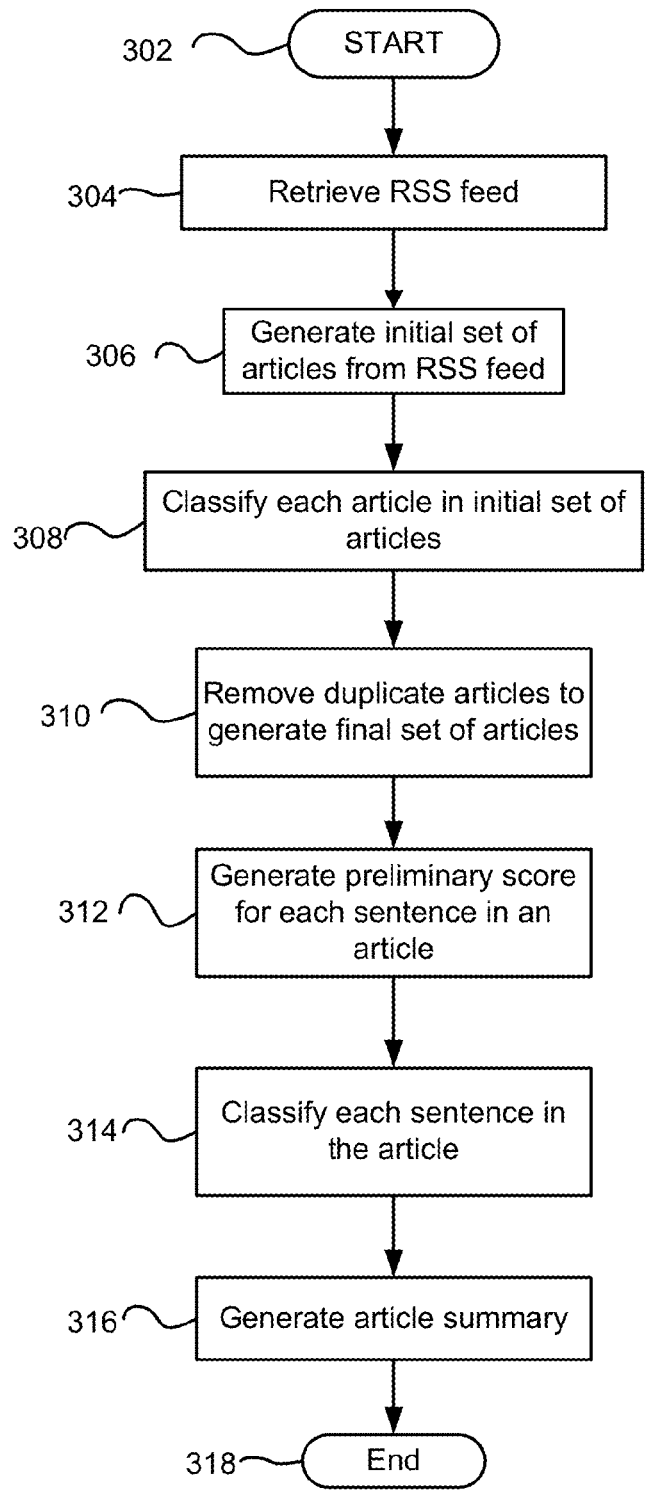
FIG. 3 is a flowchart illustrating the functionality of a method according to a particular embodiment.

FIG. 3 is a flowchart illustrating the functionality for generating an article summary based on an article title and body of text. This exemplary method 300 may be provided by way of example, as there are a variety of ways to carry out the method. The method 300 shown in FIG. 3 can be executed or otherwise performed by one or a combination of various systems. The method 300 is described below may be carried out by the systems and networks shown in FIGS. 1 and 2, by way of example, and various elements of the systems and networks are referenced in explaining the example method of FIG. 3. Each block shown in FIG. 3 represents one or more processes, methods or subroutines carried out in exemplary method 300. Referring to FIG. 3, exemplary method 300 may begin at block 302.

At block 304, summarization system 110 retrieves an RSS feed. The RSS feed may include one or more entries identifying articles from content provider 104. Summarization system 110 may regularly retrieve one or more RSS feeds and store them in data storage 120. Method 300 may proceed to block 306.

At block 306, summarization system 110 generates an initial set of articles from the RSS feed. Summarization system 110 may first parse the RSS feeds to retrieve a list of URLs, where each URL is associated with an article. Summarization system 110 may compare the list of URLs to a list of previously retrieved URLs in data storage 120 and remove any matching URLs. Summarization system 110 may also parse the RSS feed to retrieve the title and publication date of each article in the feed. Summarization system 110 may then retrieve the textual content embedded in the HTML code of the article from the URL. Summarization system 110 may remove boilerplate text snippets that do not belong to the body of text of the reported story. Examples of boilerplate text may include copyright notices, and error messages generated during the scraping and image captioning text. Extraction module 206 may also extract the author of the article, which is used as an anchor to remove automatically generated paragraphs that describe the background and experience of the author reporting the story. Summarization system may then generate an initial set of articles, where each article in the set includes the title, publication date, source, and body text of the article. Method 300 may proceed to block 308.

At block 308, summarization system 110 classifies each article in the initial set of articles. Summarization system 110 may classify each article into one or more news categories. News categories may include for example, and without limitation, U.S. News, World News, Business, Technology, Politics, Sports, Entertainment, Science, and Health. Summarization system 110 may apply one or more preprocessing steps to the body of text and/or title of each article in the initial set of articles. The steps may include tokenization, lowercasing, stopwords removal, and stemming. Following these preprocessing steps, summarization system 110 may generate a vectorized document for each body of text and categorize the article text into one of the news categories. Method 300 may proceed to block 310.

At block 310, summarization system 110 removes duplicate articles from the initial set of articles to generate a final set of articles. This process may involve a two stage approach. First, summarization system 110 may compare articles with other articles in the same category to find duplicate articles. Next, summarization system 110 may compare the articles in the initial set of articles to articles that were published and previously stored in data storage 120 within a certain time period. For example, summarization system 110 may compare new articles to stored articles form the past 48 hours. Using the titles of each article in the initial set of articles, summarization system 110 may implement one or more algorithms to quantify the degree of similarity between a pair of articles. A pair of articles with titles that meet a predetermined degree of similarity will then be compared using a containment algorithm, described above as Formula 1. Summarization system 110 may use this to remove duplicates from the initial set of articles to generate a final set of articles. Method 300 may proceed to block 312.

At block 312, for each article in the final set of articles, summarization system 110 generates a preliminary score for each sentence in that article. Summarization system 110 may first preprocess each article in the final set of articles by performing tokenization, sentence splitting, truecasing, stopwords removal, and stemming. Summarization system 110 then evaluates each sentence in an article and assigns it a score. The score may be based on a series of positive and negative scoring factors. Positive scoring factors lead to a higher score and a higher rank for the sentence in the article. Negative scoring factors lower the score and lead to a lower rank for the sentence within the article. The positive and negative scoring factors may be scaled using Formula 2, as described previously. Positive scoring factors may include the position of the sentence in the article, the number of frequent words present in the sentence (where a frequent word is a word that appears a minimum number of times in the article), the number of Named Entities present in the sentence, the number of sentiment words in the sentence, and/or the number of money-related expressions in the sentence. Negative scoring factors may include the length of the sentence, and the presence or absence of different negative features. The positive and negative scoring factors for each sentence may be determined and combined using Formula 2, Formula 3, Formula 4, and/or Formula 5, as described above. Method 300 may proceed to block 314.

At block 314, summarization system 110 may classify each sentence in an article into one of three categories: (1) potential candidate sentences; (2) weakly rejected sentences; and (3) strongly rejected sentences. For a given article, only sentences that have been classified as potential candidate sentences can be used as part of the article summary. Potential candidate sentences are sentences for which no potentially impact in summary coherence has been detected, therefore, they are signaled as fully-qualified candidates for the article summary. Weakly rejected candidates are sentences for which linguistic markers that could negatively impact the summary coherence have been identified. These sentences are banned from being included in the generated summary but they're kept for further processing as they contain valuable information about the article content that needs to be explored. Strongly rejected candidates are sentences that, because they contain some kind of boilerplate element, completely discarded as they are deemed as not containing valuable content for the article.

Summarization system 110 may classify a sentence as a weakly rejected sentence based on the presence of one or more weak linguistic markers. Weak linguistic markers may include personal pronouns, demonstrative pronouns, adversative conjunctions, concessive conjunctions, coordinating conjunctions, adverbial discourse connectors, deictic meta-discourse connectors, and/or temporal adverbs. Summarization system 110 may classify a sentence as a weakly rejected sentence if the sentence does not include a verb. Summarization system 110 may classify a sentence as a strongly rejected sentence based on the presence of one or more strong linguistic markers. Strong linguistic markers may include gratitude nouns and verbs, greetings, and/or exclamations. Summarization system 110 may classify a sentence as a strongly rejected sentence based on the presence of lexical terms that belong to the jargon of hypertext, like the verb 'click' in "Click here to find out more", are also used as clues that signal strongly rejected sentences. If a sentence does not contain a minimum number of strong linguistic markers and/or weak linguistic markers, summarization system 110 may classify the sentence as a potential candidate sentence. Method 300 may proceed to block 316.

At block 316, summarization system generates an article summary for each article in the final set of articles. The article summary is comprised of a series of one or more sentences from the set of potential candidate sentences for that article. Summarization system 110 uses an iterative algorithm, Formula 7, as described above, to construct the article summary from the set of potential candidate sentences for that article.

As a sentence is added to the article summary, it is removed from the set of potential candidate sentences for that article. This process will continue until the length of the article summary has reached a predetermined number of characters. Summarization system 110 may then provide the article summary to be viewed on an interactive interface on a user device. Method 300 may proceed to block 318.

At block 318, method 300 may end.

Figure 4A:
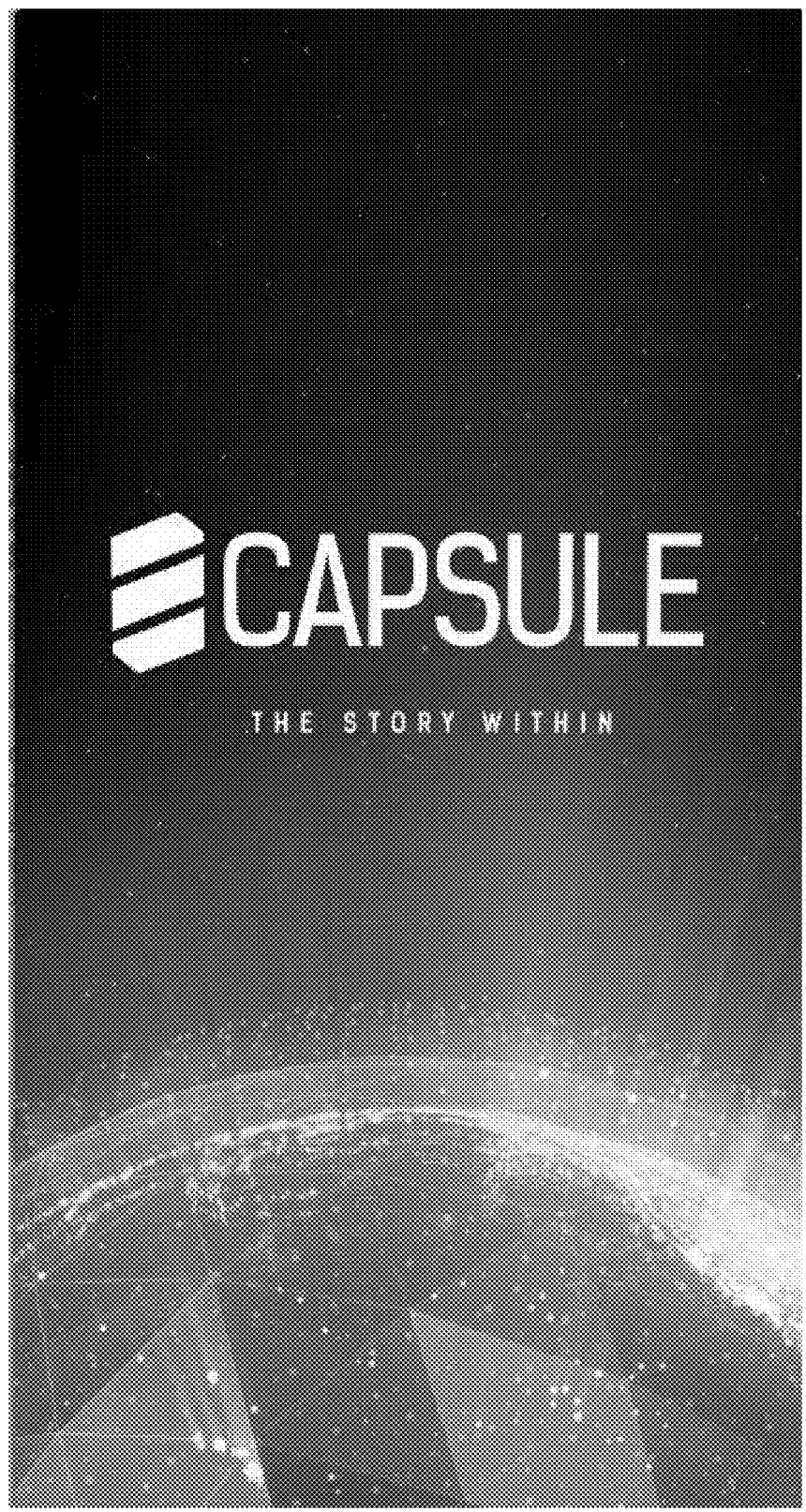
FIG. 4A is a screenshot of a capsule screen according to a particular embodiment.
Figure 4B:
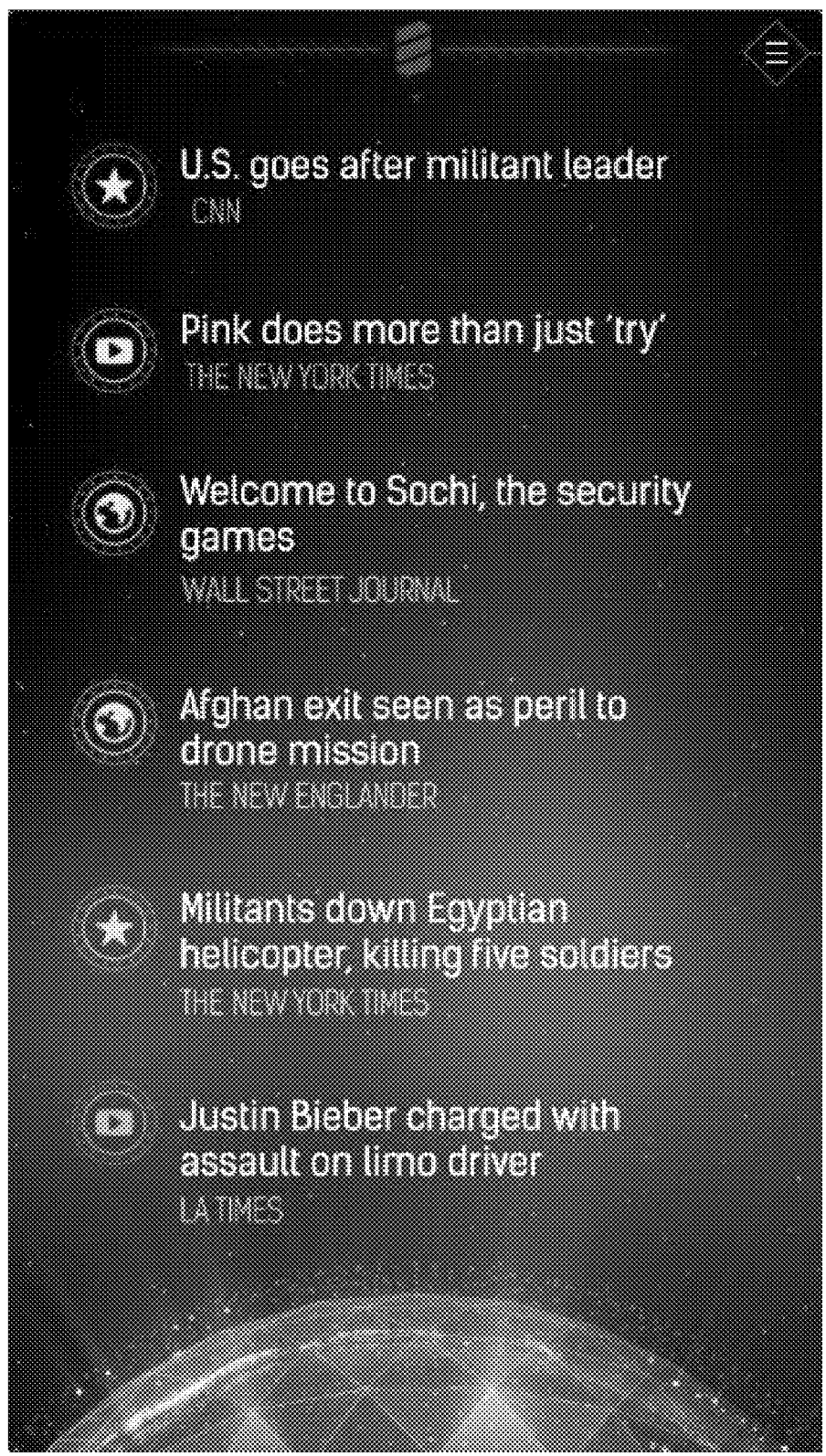
FIG. 4B is a screenshot of a particular embodiment.
Figure 4C:
FIG. 4C is a screenshot of a particular embodiment.
Figure 4D:
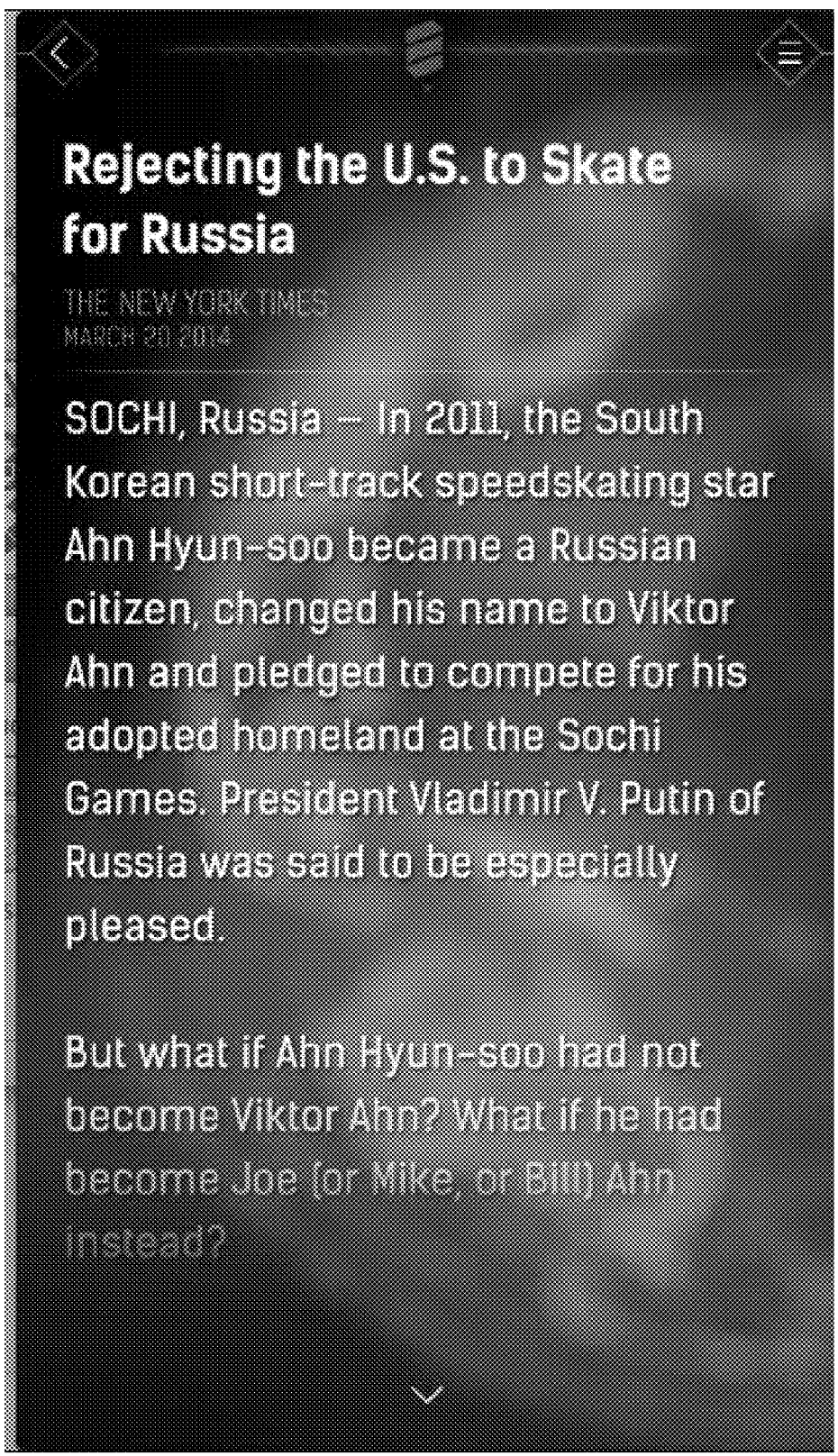
FIG. 4D is a screenshot of a particular embodiment.

FIGS. 4A-4D show different interface screens generated by summarization system 110, according to an embodiment. The screens may be provided to a user via an application on a mobile device (such as summarization application 102b) and/or a web interface. FIG. 4A shows an initial screen for summarization application 102b. FIG. 4B shows a list of article titles from a final set of articles. The article titles also include the source for the article, listed below each title. The screen shown in FIG. 4B may be interactive and receive inputs from the user. For example, the user may be able to select a given article title and be presented with the article summary, as shown in FIG. 4D.

FIG. 4C shows a list of articles that have been categorized under the category of "U.S. News." The list includes the article title and the source. The screen may receive one or more selections from the user, as with the screen in FIG. 4B. FIG. 4D depicts an article summary generated by summarization system 110 as described above. The article summary is designed to be viewed on a single screen of user device 102a. The summary may include the article's title, source, date, author name, and/or byline. The user may be able to scroll through the summary and view the entire text of the article.

In some embodiments, certain types of articles may require modified processing, based on the structure of the article. These types of articles have an internal discourse structure does not fit the assumption that a unique discourse coherence articulates the paragraphs and sentences of the entire article from the beginning to the end. For example, many articles are a "Top X" list articles (e.g., "Top 10 Smartphones on the Market", "15 best beaches in California", "Top 50 NFL Players of all Time"). The structure of these "Top X" list articles typically features a preliminary set of paragraphs that introduce the general topic discussed in the article, followed by a series of sections that examine this general topic from different angles. Each of these sections can be considered as a self-focused mini document with its own internal coherence. Using the single-document summarization process described above to access the sentences from each independent self-focused section would greatly increase the risk of generating non-coherent sentence summaries. Therefore, a special summarization strategy needs to be implemented in order to acknowledge their singularity in terms of their internal structure and coherence.

The modified summarization strategy would work using the following steps. First, any one of parser module 204, extraction module 206, and/or classification module 208 may check the title of an article using a set of functions to determine whether the article belongs in the category of "Top X" list articles. In particular, these functions check for the existence of numbers of up to three digits that are not followed by time expressions (such as "years", "months" or "days", etc.) or the existence of numbers in word form (such as "four", "ten", "two", etc.). These modules also check the body text of the article to find the number of items listed in the article. One or more modules may explore the HTML code of the article to identify a set of HTML tags that enclose the title of each section of the independent list items in the article. If the number of section titles in the article body text matches the number expressed in the title, the article is classified as a "Top X" list type article and the section titles are stored in a database for later use as structural anchors during summarization.

During summarization articles marked as "Top X" list articles are decomposed in text blocks using the identified section title anchors. The result of this procedure is a list of sections in which articles can broken down. Preprocessing module 212 may compare the number of section titles with the number of text blocks in the articles. If the number of section titles matches the number of text blocks it is assumed that no introduction is present, whereas if the number of section titles is lower than the number of text blocks, one or more modules mark the first section as the article introduction.

If an introductory text block is found during the previous structure decomposition step, preprocessing module 212, rules module 214, marker module 216, and summarization module 218 may generate a summary of this introductory section, as described above. Summarization module 218 may then append the list of section titles to the end of the generated summary, and this may be displayed on user device 102. If no introduction is identified by preprocessing module 212, then a summary is generated by simply appending the list of section titles found during scraping.

In various embodiments, clustering module 220 may clustering articles to help avid news readers to follow particular stories without having to hunt for related reports in the continuous stream of the news cycle. Clustering module 220 receives article documents that have been pre-processed by pre-processing module 212 (which applied lowercasing, tokenization, stopwords removal, and token stemming as described above). Unigram tokens left after applying these pre-processing routines are used to update the TF and IDF indices. Subsequently, unigram tokens with a term frequency lower than 2 in the global TF index are filtered out.

As mentioned above, articles are vectorized by applying the BoW approach. For scalability and performance reasons each news event cluster keeps track of its own BoW; in other words, each cluster defines its own vector space. Using this optimization prevents both document vectors and cluster centroids from becoming too large and sparse when vectorized, thus minimizing the use of RAM during execution and lowering the processing power needed.

However, this approach requires centroid clusters to be recomputed for each new document. This has the positive effect of keeping cluster centroids accurate at all times and, since cluster vector spaces always use a small portion of the tokens of the TF and IDF indices, cluster centroid recomputations have a minimum performance impact.

Vectorized article documents and recomputed cluster centroids are subsequently weighted using the following TF/IDF algorithm version:

$$tf(t, d) = 1 + \log(f(t, d))$$

$$idf(t, D) = \log\left(\frac{N}{|d \in D; t \in d|}\right)$$

$$tfidf(f, d) = tf(t, d) * idf(t, D)$$

where f(t,d) is the number of times term t occurs in the article document d, N is the total number of documents in the collection of documents D and |d∈D; t∈d| is the number of documents in which term t occurs. If either tf(t,d) or idf(t,D) result in non-numerical or infinite values they are converted to 0.

Vectorized and weighted article documents and recomputed cluster centroids are compared using the Cosine Similarity algorithm as a similarity measure:

similarity=(v·c/||v||*||c||), where v is the vectorized article document, c is the recomputed cluster centroid, v·c is the dot product of v and c and ||v|| and ||c|| are v and c vector norms, respectively.

In order to reduce the "attraction" power of older clusters, whose vector space tends to be larger than more recently created clusters, a second optimization is applied. This optimization consists in computing a correction cluster age factor that is subtracted from the cosine similarity:

cacf=dt−ca(if cacf<0 then cacf=0)

cacf=√(cafc/(60*60*24*30))

similarity=similarity−(alpha*cafc), where cacf is the cluster age correction factor, dt is the article document time stamp and alpha is a weighting constant empirically set to 0.15. Cluster module 220 may filter out cluster centroids that have a similarity lower than an empirically defined similarity threshold with respect to the vectorized article document. Cluster module 220 may then assign the article document to the cluster with the greatest similarity among all the remaining clusters, that is, among all the clusters with a similarity greater than the predefined similarity threshold. If no cluster has a similarity greater than the predefined similarity threshold, the article document defines its own cluster and will be subsequently compared to each new document that is processed by the cluster module 220.

Cluster module 220 may cause a cluster to be "frozen" (i.e., no new articles are added to the cluster) if the cluster's age becomes greater than a predefined age threshold or no new documents have been assigned to a cluster after a predefined period of time. Clusters may be presented to the user via the application interfaces shown in FIGS. 4a-4d.

Figure 5:
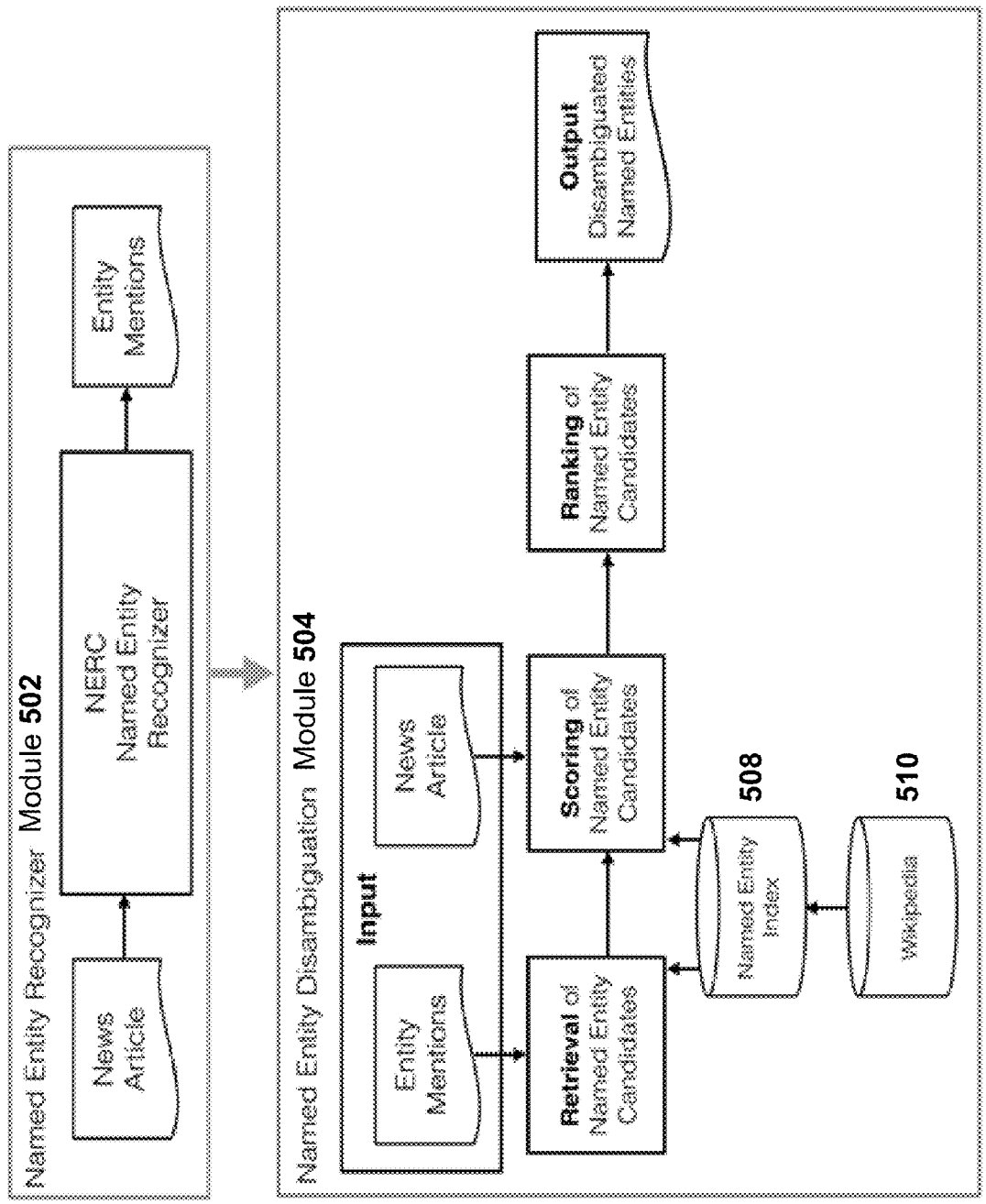
FIG. 5 is a block diagram of a hardware component according to a particular embodiment.

FIG. 5 is a schematic diagram illustrating a system according to particular embodiments. As illustrated in FIG. 5, system 500 may include a named entity recognition and classification (NERC) module 502 and a named entity disambiguation module 504. These modules may comprise one or more network-enabled computers. Modules 502 and 504 may be integrated into summarization system 110 (e.g., as part of named entities module 222).

In various embodiments, NERC module 502 may extract Named Entities (NEs) mentions from an article. These inputs may then be provided to Named Entity disambiguation module 504 which may be configured to disambiguate the NEs, and identify the most salient NEs for each article. At the end of this process, named entities module 222 may link articles that share unique salient NEs so that users can follow particular entities they are interesting in.

NERC module 502 may first extract NEs from an article using a two-step process: (1) Named Entity Recognition, and (2) Named Entity Classification. First, Named Entity Recognition is defined as the process of identifying the boundaries of NEs in sentences so that all tokens belonging to a NE are grouped together and all tokens outside the boundaries of a NE are excluded. Second, Named Entity classification is defined as the process of assigning a unique classification label to all NEs identified by during the Named Entity Recognition phase (e.g., Person, Organization, Location, or Miscellaneous). Both processes use machine learning.

The outputs from NERC module 502 may then be provided to Named Entity Disambiguation module 504, which may first map an entity mention extracted from documents to unique entries of a knowledge base. An entity mention is a sequence of tokens in a text which refers to a specific NE and has been previously identified by NERC module 502. Given the high ambiguity of language, a named entity can have multiple names and a name can be denoted by different named entities. Hence, the main goal of the named entity disambiguation process is to disambiguate the entity mentions in their textual context and identify their concrete NE referent. The knowledge base may include a Named Entity index 508 and various third party databases 510 such as Wikipedia (https://www.wikipedia.org/), Freebase (https://www.freebase.com/) or DBpedia (http://dbpedia.org/) or other data sources.

For example, NERC module 502 may analyze an article that includes the sentence "With knowledge of such widespread ferocity, I recently saw Mel Gibson's movie 'Apocalypto' which deals with the gore of the Mayan civilization." NERC module 502 may first extract the mentions "Mel Gibson" and "Apocalypto". After that, NE disambiguation module 504 would retrieve from a knowledge base (508, 510) a list of possible NE candidates that refer to each of those mentions (for example an actor and a basketball player for the mention "Mel Gibson"). The goal of the disambiguation module 504 is to identify the correct referents, in this case an actor and a film. The NE disambiguation process consists of three steps to retrieve, score and rank NE candidates for each entity mention previously extracted from articles during the NE recognition process. The output is a single disambiguated NE for each entity mention.

First, NE disambiguation module 504 gathers a list of NE candidates for each of the entity mentions extracted by the NERC module 502. This may be extracted from one or more databases, such as index 508 and/or third party database 510. The index 508 may include NEs with the following information: title, alias (other names of the NE), links to other NEs, in-degree score (the count of links pointing to the entity), out-degree score (the count of links to other NEs). NE disambiguation module 504 may use the Named Entity Index 508 to retrieve candidates for a given entity mention by searching on the title and alias fields. For each candidate, the index provides a popularity score computed by the entity in-degree and out-degree link counts in the Wikipedia graph. The popularity score is also enriched with the search relevance score provided by ElasticSearch, available from Elastic, which is based on Lucene's practical scoring function. Finally, the output of this process is a dictionary of entity mentions as keys, and a list of NE candidates as values of each key.

The second step is a set of scoring functions that aim at obtaining two main representations of each NE candidate. The first is a confidence score that is an independent representation of each single NE candidate without considering any other candidates of the article. This score includes two dimensions: (1) Local NE confidence, and (2) Global NE confidence. Local NE confidence is the sum of: a) cosine similarity of the NE candidate name and alias against the sequence of the entity mention as found in the article (e.g. "mention: Mel Gibson" vs. "entity name: Mel Gibson", "entity alias: Mel Columcille Gerard Gibson", etc.), and b) cosine similarity of the candidate linked entities against the textual context surrounding the mention, which can be the single sentence, paragraph or complete article where the mention occur. The Global NE confidence refers to the popularity of the candidate in the knowledge base where it was obtained.

The second score is a collective score. Named entity disambiguation module 504 may generate a graph where it stores all NE candidates as nodes and existing relations among them as edges. The edges are drawn only between candidates of different entity mentions and only if a given relation is found using the links of the entity page from Wikipedia. Using this graph, the collective score is computed by generating the PageRank of each node.

Next, Named entity disambiguation module 504 may generate different ranks for each entity mention and the dynamic selection of the best top rank. A rank is an ordered list of the NE candidates generated by some combinations of the scores described above. The main ranks used are Rank by Local Confidence+PageRank, and Rank by Combined Confidence (Local+Global Confidence)+PageRank. Named Entity Disambiguation module 504 then selects the best top rank by normalizing the scores of each list to sum to 1 and computing the difference between the scores of the top two candidates in the given list. The idea behind this is that a bigger difference in the scores would indicate more confidence for the discrimination of candidates. In this way, the final NE candidate is selected from the rank with a highest difference score. This method equilibrates the cases where a false candidate is selected as the top one because it has a significantly higher popularity score (retrieved by the global confidence); in this case, the local confidence provides a higher difference between the top candidates and avoids the selection of the wrong one.

After NEs have been disambiguated, Named entity disambiguation module 504 may analyze and classify the NEs to determine what NEs are most salient. As pointed out by (Gamon et al., 2013a: 1), "salience and importance/prominence are not the same". Whereas importance/prominence is a function of the reader needs, that is, what the reader considers to be most important/prominent; salience is a function of the author, that is, the entities that the author considers to be the most relevant for a particular article. In other words, the most salient NEs are the most prominent entities from a content and discursive point of view, better summarizing the information encapsulated in an article.

NESI, short for Named Entity Salience Identification, is a Machine Learning module trained using a subset of the New York Times Salience corpus (known as nyt-salience), which accompanied the paper Dunietz & Gillick, 2014. The New York Times Salience corpus extends the 1.8 million articles compiled in the New York Times Annotated Corpus with NEs automatically extracted from those articles that are primarily annotated with their Freebase mid, that is their unique id, and their automatically inferred salience.

As previously mentioned, NESI was trained using a subset of the New York Times Salience corpus. In particular we used the first 30000 articles, but discarded all articles for which no salient entities were automatically identified by the algorithm that Dunietz & Gillick (2014) used. Finally, in order to use a more balanced dataset, non-salient NEs were randomized and reduced to the same number of salient NEs. During training this proved to be beneficial as it reduced the bias of the trained algorithm towards non-salient NEs.

NESI was trained using a supervised Support Vector Machines algorithm with RBF kernel that learned from the following features: The complete Named Entity is in the article's title; The complete Named Entity is in the article's first line; Named Entity count; Named Entity start byte-offset; Number of Named Entity words that are in the article's title; Length in words of the Named Entity; Length in words of the article's title; and the Number of related entities that are present in the article's list of extracted Named Entities after their disambiguation and linking to a Knowledge Base (Wikipedia). In order to improve precision of the learned models, at the cost of some recall, all NEs identified as salient that have a prediction probability lower than 0.875 are deemed as non salient.

The most important advantages of NESI's with respect to Dunietz & Gillick's are that: 1) NESI is lighter in terms of running time and processing power as it doesn't need to run a PoS tagger, a dependency parser and a NP extractor; and 2) The feature set NESI uses is not lexicalized, and therefore not dependent on the corpus used for training and evaluation.

Since it is possible that for any particular article no NE is found to be salient by NESI's core ML learning algorithm, we applied a set of backup heuristics to ensure that at least one NE is classified as salient. In order to prioritize the set of two backup heuristics to be applied in case no NE is found to salient we used the results obtained by training NESI's ML algorithm using only one of the isolated binary features listed above. The reason why we chose only binary features is that results obtained using this type of features are easier to understand in contrast to continuous numerical features. Thus, the following heuristics are applied: Heuristic 1—If no NE has been found to be salient, all NEs that are either present in the title or the first line of the article and their count is greater than 1 it is classified as salient. Heuristic 2—If after applying heuristic 1 no NE has yet been found to be salient, the NE with the lowest start offset and the greatest count is classified as salient.

The various computing devices above (including phones and network equipment), generally include computer-executable instructions, where the instructions may be executable by one or more processors. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary. The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system, comprising:
    an interface processor that provides an interactive graphical user interface to a user device over a network;
    a parser processor that retrieves an RSS feed over the network, and generate an initial set of articles based on the RSS feed;
    a categorization processor that categorizes each article in the initial set of articles into one of a plurality of subject matter categories;
    a deduplication processor that generates a final set of articles by removing duplicate articles from the initial set of articles, wherein each article in the final set of articles comprises a plurality of sentences and a title; and
    a summarization processor that, for each article in the final set of articles:
        generates a preliminary score for each sentence in the plurality of sentences,
        assigns each sentence in the plurality of sentences to one of three categories,
        generates an article summary, wherein the article summary comprises one or more sentences from one of the three categories, wherein the article summary is based at least in part on the preliminary score for each sentence, and
        provides the article summary to the user device over the network via the interface processor;
        wherein the three categories consist of strongly rejected sentences, weakly rejected sentences, and potential candidate sentences.

2. The system of claim 1, wherein the summarization processor assigns a sentence in the plurality of sentences to the weakly rejected sentences category based at least in part on one or more weak linguistic markers in the sentence, wherein the one or more weak linguistic markers include personal pronouns, demonstrative pronouns, adversative conjunctions, concessive conjunctions, coordinating conjunctions, adverbial discourse connectors, deictic metadiscourse connectors, temporal adverbs, and no verbs.

3. The system of claim 1, wherein the summarization processor assigns a sentence in the plurality of sentences to the strongly rejected sentences category based at least in part on one or more strong linguistic markers in the sentence, wherein the one or more strong linguistic markers include gratitude nouns, gratitude verbs, greetings, exclamations, and hypertext jargon.

4. The system of claim 1, wherein the summarization processor generates an article summary by:
    1) determining a maximal marginal relevance score for each sentence in the potential candidate sentences category based at least in part on the preliminary score for that sentence, the title of the article, a vector space of the combination of the sentences in the potential candidate sentences category and the sentences in the weakly rejected sentences category, and a weighting constant;
    2) adding the sentence with the highest maximal marginal relevance score to the article summary;
    3) removing the sentence with the highest maximal marginal relevance score from the potential candidate sentences category; and 4) repeating steps 1-3 until the number of characters in the article summary reaches a predetermined threshold.

5. The system of claim 4, wherein the summarization processor reorders the sentences in the article summary based on the sentence's position in the article.

6. The system of claim 4, wherein each article summary is categorized into the same subject matter category as the corresponding article.

7. A method, comprising:
   retrieving, using a network-enabled computer, an RSS feed, wherein the RSS feed comprises a collection of articles;
   generating an initial set of articles based on the RSS feed;
   categorizing each article in the initial set of articles into one of a plurality of subject matter categories;
   generating a final set of articles by removing duplicate articles from the initial set of articles, wherein each article in the final set of articles comprises a plurality of sentences; and
   for each article in the final set of articles:
      generating a preliminary score for each sentence in the plurality of sentences,
      assigning each sentence in the plurality of sentences to one of three categories,
      generating an article summary, wherein the article summary comprises one or more sentences from one of the three categories, wherein the article summary is based at least in part on the preliminary score for each sentence, and
      providing the article summary to a user device over a network;
   wherein the three categories consist of strongly rejected sentences, weakly rejected sentences, and potential candidate sentences.

8. The method of claim 7, assigning each sentence in the plurality of sentences to one of three categories comprises assigning a sentence in the plurality of sentences to the weakly rejected sentences category based at least in part on one or more weak linguistic markers in the sentence, wherein the one or more weak linguistic markers include personal pronouns, demonstrative pronouns, adversative conjunctions, concessive conjunctions, coordinating conjunctions, adverbial discourse connectors, deictic metadiscourse connectors, temporal adverbs, and no verbs.

9. The method of claim 7, assigning each sentence in the plurality of sentences to one of three categories comprises assigning a sentence in the plurality of sentences to the strongly rejected sentences category based at least in part on one or more strong linguistic markers in the sentence, wherein the one or more strong linguistic markers include gratitude nouns, gratitude verbs, greetings, exclamations, and hypertext jargon.

10. The method of claim 7, wherein generating an article summary comprises:
   1) determining a maximal marginal relevance score for each sentence in the potential candidate sentences category based at least in part on the preliminary score for that sentence, the title of the article, a vector space of the combination of the sentences in the potential candidate sentences category and the sentences in the weakly rejected sentences category, and a weighting constant;
   2) adding the sentence with the highest maximal marginal relevance score to the article summary;
   3) removing the sentence with the highest maximal marginal relevance score from the potential candidate sentences category; and
   4) repeating steps 1-3 until the number of characters in the article summary reaches a predetermined threshold.

11. The method of claim 10, further comprising reordering the sentences in the article summary based on the sentence's position in the article.

12. The method of claim 10, further comprising categorizing each article summary into the same subject matter category as the corresponding article.

* * * * *